United States Patent [19]

Geringer

[11] Patent Number: 5,958,846
[45] Date of Patent: Sep. 28, 1999

[54] SOLID LUBRICANT, ESPECIALLY FOR FRICTION LININGS, FRICTION LINING MIXTURES

[75] Inventor: Michael Geringer, Villach, Austria

[73] Assignee: Chemetall Ges. m.b.H., Arnoldstein, Austria

[21] Appl. No.: 08/973,092

[22] PCT Filed: Apr. 12, 1996

[86] PCT No.: PCT/AT96/00071

§ 371 Date: Nov. 3, 1997

§ 102(e) Date: Nov. 3, 1997

[87] PCT Pub. No.: WO96/36681

PCT Pub. Date: Nov. 21, 1996

[30] Foreign Application Priority Data

May 17, 1995 [AT] Austria ..................................... 838/95

[51] Int. Cl.⁶ ............................................. C10M 125/22
[52] U.S. Cl. .......................... 508/108; 508/166; 508/167; 423/511
[58] Field of Search ................................ 508/108, 166, 508/167; 423/511

[56] References Cited

U.S. PATENT DOCUMENTS

| | | | |
|---|---|---|---|
| 3,372,997 | 3/1968 | Bither, Jr. | 423/511 |
| 3,377,277 | 4/1968 | Soulen | 508/166 |
| 3,576,765 | 4/1971 | Valiet et al. | 423/511 |
| 3,773,909 | 11/1973 | Pearlman et al. | 423/511 |
| 3,851,045 | 11/1974 | Donahue | 423/263 |
| 3,945,935 | 3/1976 | Torp et al. | 423/511 |
| 4,130,492 | 12/1978 | Longo et al. | 252/18 |
| 4,159,962 | 7/1979 | Di Salvo, Jr. et al. | 423/511 |
| 4,261,741 | 4/1981 | Terrat | 75/134 |
| 4,465,604 | 8/1984 | King | 508/167 |
| 4,545,973 | 10/1985 | King | 423/511 |
| 4,663,060 | 5/1987 | Holinski | 508/108 |

FOREIGN PATENT DOCUMENTS

| | | |
|---|---|---|
| 0 328 514 | 8/1989 | European Pat. Off. . |
| 2 388 042 | 11/1978 | France . |
| 0156917 | 9/1984 | Japan . |
| 3093630 | 4/1991 | Japan . |
| WO 95/02657 | 1/1995 | WIPO . |

OTHER PUBLICATIONS

Plovnick et al., Preparation and Structural Properties of Some Ternary Chalcogenides of Titanium, 1968, pp. 127–129.

Adams et al., Crystal Growth of $CuFeS_2$, Mat. Res. Bull. vol. 7, pp. 87–91, 1972.

Primary Examiner—Jerry D. Johnson
Attorney, Agent, or Firm—Seidel, Gonda, Lavorgna & Monaco, PC

[57] ABSTRACT

A solid lubricant, in particular for friction linings, on the basis of metal sulphides, which contains or consists of at least one compound of the formula $$M1_l M2_m M3_n S_x$$

wherein M1, M2, and M3 each represent one metal of the series of Ti, V, Mn, Fe, Cu, Zn, Mo, W, Sb, Sn and Bi, S denotes sulphur, and the subscripts comprise the ranges of l=1–5, m=1–5, n=0–5 and x=2–8, as well as friction lining mixtures and friction linings containing the same.

6 Claims, No Drawings

SOLID LUBRICANT, ESPECIALLY FOR FRICTION LININGS, FRICTION LINING MIXTURES

The present invention relates to a solid lubricant, in particular for friction linings, on the basis of metal sulphides, as well as to friction lining mixtures and friction linings containing the same, such as brake or clutch linings.

For instance, $MoS_2$ being a sulphide has long been known as a solid lubricant for the formation of a solid lubricant film between surfaces intended to glide with regard to each other. $MoS_2$ and other metal sulphides are also used as components of gliding compositions consisting e.g. primarily of PTFE, i.e. for instance plain bearing half liners or slide bushings, in order to reduce surface friction.

Metal sulphides are also used as solid lubricants in a completely different field, namely in the production of friction elements, such as brake blocks, brake shoes, brake and clutch linings, the purpose of which is not the prevention of friction but the generation of friction.

Thus it is obvious that the aim of using solid lubricants in friction linings is not the reduction of friction, but rather the stabilisation of the frictional behaviour in relation to time, resulting in the reduction of abrasive processes and in a positive effect on wear and vibration characteristics. A highly desirable side effect when using certain solid lubricants is a considerable stabilisation of the coefficient of friction, i.e. the detrimental dependence of the coefficient of friction and thus of braking efficiency on temperature, pressure load and speed, is suppressed to a major extent.

Those best known among the special solid lubricants used in friction linings are graphite and molybdenum disulphide, But there are a number of other metal sulphides used almost exclusively in friction linings, differing from those mentioned above primarily with respect to the stabilisation of the coefficient of friction.

Publications to be mentioned in this context are EP497, 751 and AT-399,162, which are concerned with various metal sulphides and combinations thereof, respectively.

One well-known and frequently used solid lubricant for friction linings is lead sulphide, which will however be available for future applications to a constantly reduced extent because of the increasing ecological sensibilization against heavy metals. But according to the present art, the good and favourable characteristics of this material make it practically impossible to use a substitute for lead sulphide without impairing the quality of the friction lining.

For many years there have been attempts to produce synergistic mixtures having extraordinary effects by combining various solid lubricants on the basis of graphites, sulphides, fluorides, phosphates etc. (see DE 25 14 575, DE 35 13 031 or EP-328,514). However, these or similar combinations have so far not been successful in achieving an effect that is satisfactory in every respect.

Even the combinations of AT-399162 on the basis of the sulphides of copper with those of zinc, antimony, molybdenum, tin, tungsten and titanium, in spite of their generally favourable properties, are not fully satisfactory with respect to their effect either. Even less common sulphides, like that of bismuth, are no satisfactory solution.

Now it has surprisingly been found that a number of bimetal and trimetal sulphides, when used as solid lubricants, in particular in friction linings, give excellent results, among others much more favourable results than single-metal sulphide mixtures of analogous composition.

Accordingly, the present invention primarily proposes a solid lubricant, in particular for friction linings that are preferably resin-bound, on the basis of metal sulphides, characterized in that the solid lubricant contains or consists of at least one compound of the formula $$M1_l M2_m M3_n S_x$$

wherein M1, M2, and M3 each represent one metal of the series of Ti, V, Mn, Fe, Cu, Zn, Mo, W, Sb, Sn and Bi, S denotes sulphur, and the subscripts comprise the ranges of l=1–5, m=1–5, n=0–5 and x=2–8.

Preferably the solid lubricant is a polyphase sulphide mixture, in particular a combination of at least one compound of the formula $$M1_l M2_m M3_n S_x$$

with one or several sulphides of Ti, V, Mn, Fe, Cu, Zn, Mo, W, Sb, Sn and Bi.

Furthermore the invention proposes the corresponding friction lining mixtures and friction linings containing such solid lubricants.

Bimetal sulphides and trimetal sulphides of the above group are described, the literature and exist as minerals as well; for the purpose of exemplification only (giving the corresponding minerals in brackets), $Cu_2FeSnS_4$ (stannite), $Cu_2FeSn_3S_8$ (rhodostannite), $Cu_3SnS_4$ (curmanite), $Mn_2SnS_4$, $SnFe_2S_4$, $Cu_2TiS_2$ may be mentioned.

The bimetal and trimetal sulphides proposed as solid lubricants by the invention may be produced according to usual processes for the production of sulphides, namely sulphidization (heating of metal powders with sulphur or polysulphides) or reaction of hydroxides or oxides with ammonium sulphide or $H_2S$ according to a wet-chemical or dry method.

Typically the polymetal sulphides may be produced via a melt phase, e.g. by fusing together binary pure sulphides while excluding air, This often results in mixtures of several different phases. The wet-chemical precipitation of polymetal sulphides is described the literature as well. It has been shown that proportional amounts of polymetal sulphides are also formed in the course of sulphidizing metal alloys and metal powder mixtures, which can be ascertained by X-ray diffraction or using an electron microscope by means of a microprobe.

In the following, the invention will be described in more detail by way of non-limiting examples.

EXAMPLES

A typical disk brake lining recipe was used for comparing the sulphides according to the invention with known solid lubricants. The batch, not yet containing sulphides is mixed in a plough blade mixer with a knife head. In order to produce the specimens, the solid lubricants to be compared are subsequently blended into the premix in constant proportions, pressed in a pressure- and temperature-controlled laboratory press so as to form disk brake linings common in vehicles, and tested on a Krauss torque stand.

The test recipe has the following composition:

| | |
|---|---|
| steel wool | 10% by weight |
| metal powder | 15% |
| fibers | 9% |
| organic components | 11% |
| friction materials | 9% |
| fillers | 25% |

| | |
|---|---|
| graphite | 13% |
| sulphide | 8% |

During the test program particular attention was given to the stability of the coefficient of friction and wear characteristics at high loads, as the favourable characteristics of the sulphides are especially effective under these conditions.

The following test program was chosen:

1st) running-in phase with 100 stops for conditioning of the surfaces;
2nd) v-test: 6 cycles with 5 stops each in series, each cycle starting at 100° C., followed by 7 cycles with 10 stops each in series, at a temperature corresponding to 140 km/h and a pressure of 20 bar;
3rd) p-test: by analogy to v-test at a temperature corresponding to 60 km/h and a pressure of 50 bar.

During the 10-stop cycle the temperature rises to about 550° C., so that a temperature profile of 100–550° C. is covered in the course of the test. The change of the coefficient of friction within this temperature profile and the total wear of the linings for the test are determined separately for v- and p-tests as a characteristic value.

The results of the test series can be seen in the following table. In the table, PW-v and PW-p refer to the wear of linings in v- and p-tests, in each case evaluated as reduction of weight in grams per lining, dMy-v and dMY-p refer to the variation of the coefficient of friction within one test cycle from 100 to 550° C., positive values indicating a reduction of the coefficient of friction at high temperatures.

| Solid lubricant | dMy-v | dMy-p | pW-v | PW-p |
|---|---|---|---|---|
| Comparative products: | | | | |
| PbS | −0,12 | −0,02 | 6,9 | 6,2 |
| $Cu_2S$ | −0,02 | 0,12 | 5,0 | 9,2 |
| $MoS_2$ | 0,11 | 0,08 | 13,5 | 12,5 |
| FeS | 0,05 | 0,05 | 6,5 | 8,7 |

Example 1

In order to illustrate the differences between mixtures and inventive combinations, a mixture of $Cu_2S$ (56%) and ZnS (44%) (mixture 1) is compared to combination 1. The latter is obtained by sulphidizing brass powder (Cu/Zn 60:40). Combination 1 and mixture 1 contain the same proportions of Cu, Zn and S, but are clearly different in their X-ray diffraction patterns.

| Solid lubricant | dMy-v | dMy-p | PW-v | PW-p |
|---|---|---|---|---|
| Mixture 1 | 0,03 | 0,18 | 13,7 | 15,2 |
| Combination 1 | 0,02 | 0,14 | 12,5 | 11,8 |

There are clear improvements in the lining characteristics at high pressure, resulting in a smaller decrease of the coefficient of friction and lesser wear as compared to the mixture of the binary sulphides.

Example 2

Here mixtures of binary sulphides are compared to combinations having the same proportions of elements, but having been produced by sulphidizing metal powder mixtures, where the ternary and quaternary phases according to the invention could form. The following compositions were tested:

| Composition | $Cu_2S$ | $TiS_2$ | MnS | SnS | FeS | $Bi_2S_3$ |
|---|---|---|---|---|---|---|
| Mixture 2 | 80 | 20 | | | | |
| Mixture 3 | 45 | | 50 | 5 | | |
| Mixture 4 | 50 | | | 40 | 10 | |
| Mixture 5 | 50 | | | | 20 | 30 |
| Mixture 6 | 30 | | | 40 | | 30 |

The difference in the molecular composition between mixtures 2–6 and combinations 2–6 manifests itself in the appearance of ternary and quaternary sulphide phases in the combinations. The following ternary and quaternary phases may be detected by X-ray diffraction:

Combination 2: $CuTi_{2,05}S_4$
Combination 3: $Mn_2SnS_4$
Combination 4: $Cu_5SnS_4$, $Cu_5Sn_2S_7$, $Cu_2FeSnS_4$, $Cu_2FeSn_3S_8$
Combination 5: $CuFe_2S_3$, $Cu_5FeS_4$, $CuBiS_2$
Combination 6: $Cu_2SnS_3$, $Cu_3SnS_4$, $CuBiS_2$ When using the mixtures and combinations described in the course of the test outlined above, the following values are obtained:

| Solid lubricant | dMy-v | dMy-p | PW-v | PW-p |
|---|---|---|---|---|
| Mixture 2 | −0,02 | 0,10 | 5,3 | 8,4 |
| Mixture 3 | 0,0 | 0,10 | 7,5 | 15,7 |
| Mixture 4 | 0,0 | 0,0 | 6,0 | 6,3 |
| Mixture 5 | −0,05 | 0,01 | 5,2 | 6,1 |
| Mixture 6 | −0,08 | −0,01 | 6,2 | 6,8 |
| Products according to the invention: | | | | |
| Combination 2 | −0,02 | 0,06 | 5,5 | 5,8 |
| Combination 3 | −0,04 | 0,06 | 6,7 | 13,5 |
| Combination 4 | −0,04 | 0,0 | 4,8 | 5,1 |
| Combination 5 | −0,12 | −0,03 | 4,2 | 5,2 |
| Combination 6 | −0,15 | −0,03 | 5,7 | 6,1 |

The examples given show the improvements of the combinations according to the invention as compared to the binary mixtures, wear values as well as for the stability of the coefficient of friction are influenced favourably.

Of particular conspicuousness in the pure substances shown as comparative examples is the enormous potential for stabilisation of lead sulphide, which in particular under speed load leads to a coefficient of friction increasing with temperature and thus to over-stabilisation. Pressure load also leads to over-stabilisation of the coefficient of friction, though to a lesser extent. The other binary sulphides listed above show significant drops of the coefficient of friction and partly significantly higher values of wear. By mixing different sulphides appropriately, the weaknesses of the individual sulphides may partly be compensated for, but the quality of lead sulphide cannot be achieved in this way. Only by concertedly building-up the inventive ternary and quaternary phases in the mixture is it possible to generate combinations whose quality equals the characteristics of heavy metal sulphides known to be good.

I claim:

1. A friction lining mixture containing, as a solid lubricant additive, at least one compound of the formula $$M1_l M2_m M3_n S_x$$

wherein
M1, M2 and M3 are different from each other and are selected from the group consisting of Ti, V, Mn, Fe, Cu, Zn, Mo, W, Sb, Sn and Bi,
S is sulfur,
l is from 1 to 5,
m is from 1 to 5,
n is from zero to 5, and
x is from 2 to 8.

2. A friction lining mixture according to claim 1 wherein the lubricant additive comprises a polyphase sulfide mixture.

3. A friction lining mixture according to claim 2 wherein the lubricant additive comprises a mixture of compounds of the formula $M1_l M2_m M3_n S_x$.

4. A friction lining formed from a friction lining mixture according to claim 1, 2 or 3.

5. A friction lining according to claim 4 formed from a friction lining mixture which is resin-bound.

6. A friction lining according to claim 5 comprising a brake lining or clutch lining.

* * * * *